US009070939B2

(12) United States Patent
Guen

(10) Patent No.: US 9,070,939 B2
(45) Date of Patent: Jun. 30, 2015

(54) BATTERY MODULE

(75) Inventor: Min-Hyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 60 days.

(21) Appl. No.: 13/232,866

(22) Filed: Sep. 14, 2011

(65) Prior Publication Data

US 2012/0288744 A1 Nov. 15, 2012

(30) Foreign Application Priority Data

May 9, 2011 (KR) ........................ 10-2011-0043592

(51) Int. Cl.
H01M 2/20 (2006.01)
H01M 2/30 (2006.01)
H01M 2/22 (2006.01)
H01M 2/34 (2006.01)

(52) U.S. Cl.
CPC .............. *H01M 2/305* (2013.01); *H01M 2/206* (2013.01); *H01M 2/22* (2013.01); *H01M 2/342* (2013.01)

(58) Field of Classification Search
None
See application file for complete search history.

(56) References Cited

U.S. PATENT DOCUMENTS

| 5,663,012 A * | 9/1997 | Shannon et al. ............... 429/121 |
| 6,391,489 B1 | 5/2002 | Winch et al. |
| 8,263,255 B2 | 9/2012 | Byun et al. |
| 2002/0022408 A1 | 2/2002 | Fukuda |
| 2005/0070164 A1 | 3/2005 | Mita et al. |
| 2009/0075163 A1 | 3/2009 | Shevock et al. |
| 2009/0123820 A1 | 5/2009 | Han |
| 2010/0055993 A1 | 3/2010 | Ikeda et al. |
| 2010/0233915 A1 | 9/2010 | Kim |

FOREIGN PATENT DOCUMENTS

| CN | 101388442 A | 3/2009 |
| CN | 101841055 A | 9/2010 |
| CN | 102034954 A | 4/2011 |
| GB | 2 452 820 A | 3/2009 |
| JP | 06-215757 | 8/1994 |
| JP | 11-086831 | 3/1999 |
| JP | 11-238501 | 8/1999 |
| JP | 11-250950 | 9/1999 |
| JP | 2002-056838 | 2/2002 |
| JP | 2003-249207 | 9/2003 |
| JP | 2004-055250 | 2/2004 |
| JP | 2005-038688 | 2/2005 |

(Continued)

OTHER PUBLICATIONS

European Search Report dated Sep. 26, 2012 cited in corresponding EP Application No. 12162743.4-1227, 7 pages.

(Continued)

*Primary Examiner* — Patrick Ryan
*Assistant Examiner* — Lucas O'Donnell
(74) *Attorney, Agent, or Firm* — Christie, Parker & Hale, LLP

(57) ABSTRACT

A battery module including: a plurality of rechargeable batteries including a first terminal and a second terminal; and a connecting member electrically connecting rechargeable batteries of the plurality of rechargeable batteries through the first and second terminals, the connecting member including an access protrusion protruded toward the first terminal, and the first terminal includes a pressurizer configured to press the access protrusion toward a part of the first terminal.

15 Claims, 11 Drawing Sheets

(56) References Cited

FOREIGN PATENT DOCUMENTS

| | | |
|---|---|---|
| JP | 2008-034318 | 2/2008 |
| JP | 2008-146943 | 6/2008 |
| JP | 2009-070822 | 4/2009 |
| JP | 2010-055885 A | 3/2010 |
| JP | 2010-061961 | 3/2010 |
| JP | 2010-061962 | 3/2010 |
| JP | 2010-123391 | 6/2010 |
| JP | 2010-205535 | 9/2010 |
| JP | 2010-219027 | 9/2010 |
| KR | 10-2009-0048860 A | 5/2009 |
| KR | 10-2011-0036490 | 4/2011 |

OTHER PUBLICATIONS

EPO Office action dated Apr. 15, 2013, for corresponding European Patent application 12162743.4, (12 pages).
Patent Abstracts of Japan, and English machine translation of Japanese Publication 2010-123391 dated Jun. 3, 2010, listed above, (15 pages).
JPO Office action dated Jul. 23, 2013, for corresponding Japanese Patent application 2011-171121 (3 pages).
Patent Abstracts of Japan, and English machine translation of Japanese Publication 06-215757 dated Aug. 5, 1994, listed above, (6 pages).
Patent Abstracts of Japan, and English machine translation of Japanese Publication 11-086831 dated Mar. 30, 1999, listed above, (7 pages).
Patent Abstracts of Japan, and English machine translation of Japanese Publication 11-238501 dated Aug. 31, 1999, listed above, (7 pages).
Patent Abstracts of Japan, and English machine translation of Japanese Publication 11-250950 dated Sep. 17, 1999, listed above, (8 pages).
Patent Abstracts of Japan, and English machine translation of Japanese Publication 2003-249207 dated Sep. 5, 2003, listed above, (11 pages).
Patent Abstracts of Japan, and English machine translation of Japanese Publication 2004-055250 dated Feb. 19, 2004, listed above, (10 pages).
Patent Abstracts of Japan, and English machine translation of Japanese Publication 2008-034318 dated Feb. 14. 2008, listed above, (19 pages).
Patent Abstracts of Japan, and English machine translation of Japanese Publication 2010-061962 dated Mar. 18. 2010, listed above, (13 pages).
JPO Notice of Allowance dated Nov. 12, 2013, for corresponding Japanese Patent application 2011-171121, (3 pages).
Patent Abstracts of Japan, and English machine translation of Japanese Publication 2005-038688 dated Feb. 10, 2005, listed above, (11 pages).
Patent Abstracts of Japan, and English machine translation of Japanese Publication 2008-146943 dated Jun. 26, 2008, listed above, (12 pages).
SIPO Office action dated Apr. 28, 2015, with English translation, for corresponding Chinese Patent application 201110350694.8, (18 pages).

* cited by examiner

BATTERY MODULE

CROSS-REFERENCE TO RELATED APPLICATION

This application claims priority to and the benefit of Korean Patent Application No. 10-2011-0043592, filed on May 9, 2011 in the Korean Intellectual Property Office, the entire content of which is incorporated herein by reference.

BACKGROUND

1. Field

Aspects of embodiments of the present invention relate to a battery module.

2. Description of the Related Art

A rechargeable battery differs from a primary battery in that it can be repeatedly charged and discharged, while the latter makes only the irreversible conversion of chemical to electrical energy. A low-capacity rechargeable battery may be used as the power supply for small electronic devices, such as cellular phones, notebook computers, and camcorders, while a high-capacity rechargeable battery may be used as the power supply for driving motors in hybrid vehicles, electric vehicles, and the like.

A high-power rechargeable battery using a non-aqueous electrolyte with a high energy density has been recently developed. For example, the high-power rechargeable battery is constructed with a high-capacity rechargeable battery having a plurality of rechargeable cells coupled to each other in series such that it can be used as the power supply for driving motors in hybrid vehicles and electric vehicles requiring high power.

In addition, a large-capacity rechargeable battery generally includes a plurality of rechargeable batteries that are coupled in series, and the rechargeable battery may have cylindrical or prismatic shapes.

The prismatic-shaped rechargeable battery includes an electrode assembly that has an anode and a cathode with a separator interposed therebetween, a case having a space receiving the electrode assembly, and a cap plate that seals the case and has a terminal hole in which an electrode terminal is inserted, and the electrode terminal is electrically connected with the electrode assembly, inserted in the terminal hole, and protruded outside the case.

The electrode terminal is fixed to the cap plate by a nut, but there is a problem in that the nut may be loosened by continuous external vibration or shock. The loosened nut causes contact resistance inside the rechargeable batteries, such that the output and cycle-life of the rechargeable batteries are reduced.

A method for connecting a connecting member to the first terminal and the second terminal through resistance welding has been proposed to overcome the problem.

However, when the connecting member is made of a different material from that of the first terminal or the second terminal, there is a problem in that it is difficult to bond the connecting member and the terminals using resistance welding or ultrasonic welding because of different melting points.

The above information disclosed in this Background section is only for enhancement of understanding of the background of the described technology and therefore it may contain information that does not form the prior art that is already known in this country to a person of ordinary skill in the art.

SUMMARY

According to an aspect of embodiments of the present invention, a battery module includes a connecting member and terminals that are easily and stably fixed.

According to an embodiment of the present invention, a battery module includes: a plurality of rechargeable batteries including a first terminal and a second terminal; and a connecting member electrically connecting rechargeable batteries of the plurality of rechargeable batteries through the first and second terminals, the connecting member including an access protrusion protruded toward the first terminal, and the first terminal includes a pressurizer configured to press the access protrusion toward a part of the first terminal.

In one embodiment, the part of the first terminal has an access groove, and the access protrusion is received in the access groove. In one embodiment, the connecting member further includes a connecting plate; a first access unit protruded at an end of the connecting plate in a lengthwise direction; and a second access unit protruded at another end of the connecting plate in the lengthwise direction, and the access protrusion is on the first access unit, and the connecting member further includes another access protrusion on the second access unit.

A width of the first access unit in a widthwise direction may be greater than a width of the second access unit in the widthwise direction. The first terminal may have a connecting groove into which the first access unit is inserted, and the pressurizer may protrude toward the inside of the connecting groove.

A top surface of the first access unit may be formed below a top surface of the connecting plate. In one embodiment, the pressurizer includes a reinforcing unit protruded toward and contacting the first access unit. In one embodiment, the first access unit includes a reinforcing unit protruded toward and contacting the pressurizer.

The first terminal may have a groove into which the first access unit is inserted, and the pressurizer may at least partially cover an upper part of the groove. In one embodiment, the connecting member further includes a hook protruding from a first side of the connecting member, and the first terminal has a connecting groove into which the first access unit is inserted, and the first terminal includes a supporter protruding inside the connecting groove and contacting the hook.

The hook may be protruded from the connecting plate and may be spaced apart from the first access unit with a gap therebetween in a widthwise direction. The hook may include a first bar protruded from the connecting plate, and a second bar that is bent to the outside from the first bar.

In one embodiment, the hook protrudes from the first side at the end of the connecting plate, and the connecting member further includes another hook protruding at the end of the connecting plate from a second side of the connecting member opposite the first side, the connecting member further includes a second hook protruding from the first side of the connecting member at the another end of the connecting plate, and another second hook protruding from the second side of the connecting member at the another end of the connecting plate, and a distance between the hook and the another hook that are near the first access unit is greater than a distance between the second hook and the another second hook that are near the second access unit. In one embodiment, the supporter protrudes from a wall facing the connecting groove, and the first terminal further includes another supporter protruding from another wall opposite the wall and facing the connecting groove, the another supporter contacting the another hook, the second terminal has a connecting groove into which the second access unit is inserted, and the second terminal includes a second supporter protruding inside the connecting groove of the second terminal and contacting the second hook, and another second supporter protruding inside the connecting groove opposite the second supporter, the another second supporter contacting the another second hook, and a distance between the supporter and the another supporter in the connecting groove of the first terminal in which the first access unit is inserted is greater than a distance between the second supporter and the another second supporter in the connecting groove of the second terminal in which the second access unit is inserted.

The hook may be a protrusion that is protruded in a widthwise direction of the first access unit, and the supporter may be a protrusion that is protruded from the inside of the connecting groove.

According to another embodiment of the present invention, a battery module includes: a plurality of rechargeable batteries including a first terminal and a second terminal; and a connecting member electrically connecting the rechargeable batteries, and the first terminal has a connecting groove having a first opening in a side facing a first direction, a first portion of the connecting member being inserted in the first opening, and the second terminal has a connecting groove having a second opening in a side facing a second direction opposite the first direction, a second portion of the connecting member being inserted in the second opening.

In one embodiment, the first terminal includes an inner wall facing the connecting groove of the first terminal, and a supporter protruding from the inner wall, and the first portion of the connecting member includes a hook contacting the supporter and coupling the connecting member and the first terminal to each other.

According to an aspect of embodiments of the present invention, an increase of contact resistance between the terminal and the connecting member caused by vibration or external impact is prevented or substantially prevented due to insertion of the connecting member into the terminal. As such, battery modules according to embodiments of the present invention are particularly applicable as a motor-driving power source for propelling hybrid vehicles or electric vehicles.

DETAILED DESCRIPTION

Figure 1:
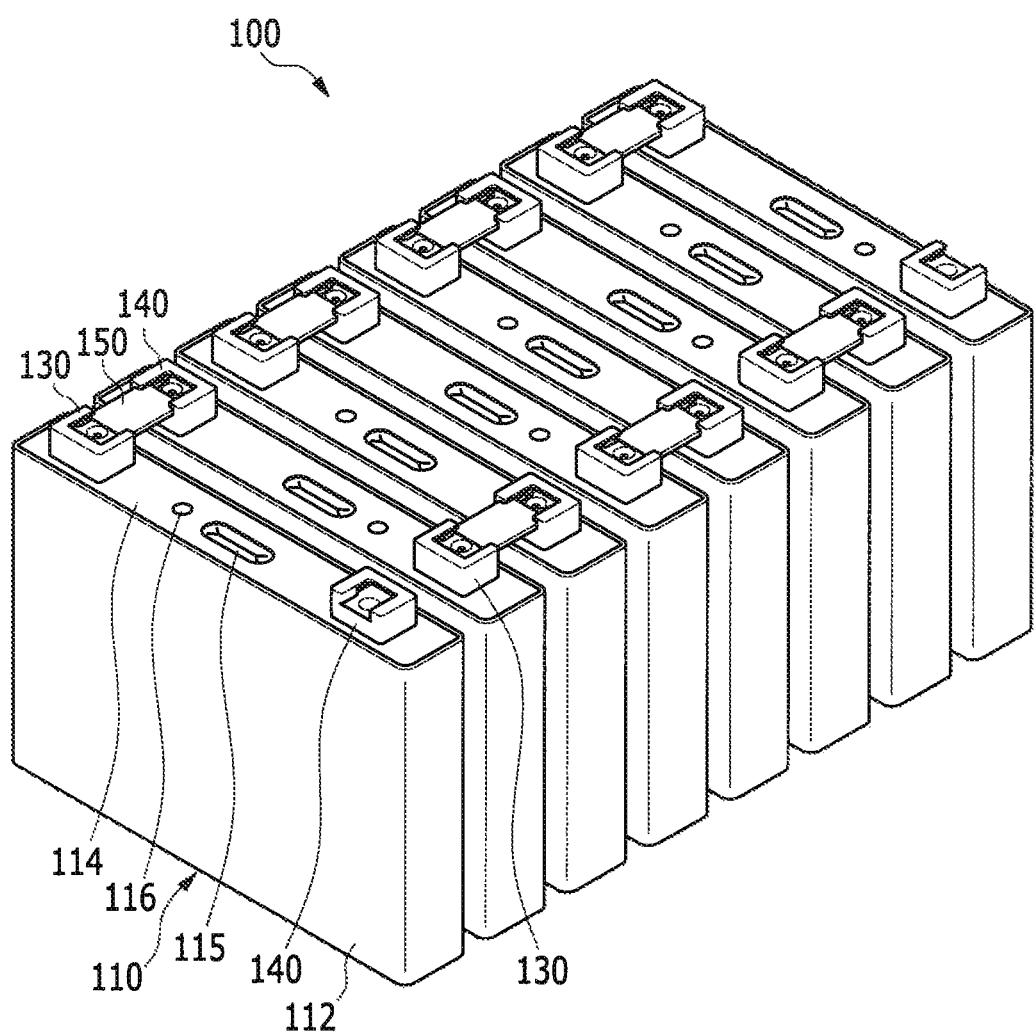
FIG. 1 is a perspective view of a battery module according to an exemplary embodiment of the present invention.

Aspects of embodiments of the present invention are described more fully hereinafter with reference to the accompanying drawings, in which some exemplary embodiments of the present invention are shown. As those skilled in the art will realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
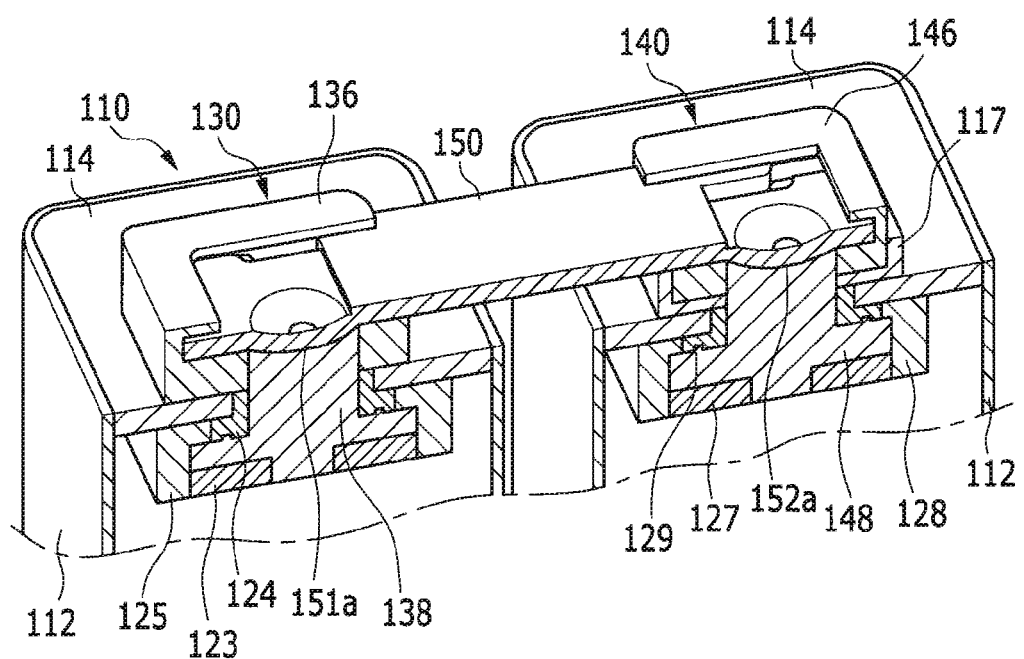
FIG. 2 is a partial sectional perspective view of the battery module of FIG. 1.

FIG. 1 is a perspective view of a battery module according to an exemplary embodiment of the present invention, and FIG. 2 is a partial sectional perspective view of the battery module of FIG. 1.

Referring to FIGS. 1 and 2, a battery module 100 includes a plurality of rechargeable batteries 110 having a first terminal 130 and a second terminal 140, and connecting members 150 for electrically connecting the rechargeable batteries 110.

In the battery module 100 according to one embodiment, the rechargeable batteries 110 are coupled in series. However, the present invention is not restricted thereto, and, in another embodiment, the rechargeable batteries 110 may be coupled in parallel.

The rechargeable battery 110 according to one exemplary embodiment may be formed in a polygonal shape and includes a case 112, a cap plate 114 connected to and closing an opening of the case 112, and the first and second terminals 130 and 140 protruding outside the case 112. Although a polygonal-shaped rechargeable battery is described herein, the present invention is not limited thereto, and, in other embodiments, the rechargeable battery may be formed in a cylindrical or any other suitable shape.

In one embodiment, a vent member 115 that is opened when an internal pressure of the rechargeable battery 110 increases and a sealing cap 116 that seals an electrolyte injection inlet are disposed on the cap plate 114.

The first and second terminals 130 and 140 are fixed to the cap plate 114 and protrude outside the cap plate 114, and gaskets 124 and 129 for insulating and sealing are disposed between the cap plate 114 and the terminals 130 and 140, respectively. The first terminal 130 and the second terminal 140 are formed in a plate shape, and are electrically connected to an electrode assembly (not shown) inserted in the case 112.

In one embodiment, the first terminal 130 is electrically connected to a positive electrode of the electrode assembly through a first current collector 123, and the second terminal 140 is electrically connected to a negative electrode of the electrode assembly through a second current collector 127. The first terminal 130 and the second terminal 140 are made of metal, and, in one embodiment, the first terminal 130 may be made of aluminum and the second terminal 140 may be made of copper.

In one embodiment, the first terminal 130 includes a bottom terminal 138 to which the first current collector 123 is fixed (e.g., via welding). In one embodiment, an access groove 138a is formed on a top surface of the bottom terminal 138, and an access protrusion 151a of the connecting member 150 is inserted into the access groove 138a. In one embodiment, the bottom terminal 138 is inserted in a hole of the first terminal 130; however, the present invention is not limited thereto. For example, in another embodiment, the bottom terminal 138 can be integrally formed with a remaining portion of the first terminal 130.

In one embodiment, the first terminal 130 is installed to contact the cap plate 114 such that the cap plate 114 functions as a positive electrode.

The second terminal 140 includes a bottom terminal 148, and the second current collector 127 is fixed to the bottom terminal 148 (e.g., via welding). In one embodiment, an access groove 148a is formed on the top surface of the bottom terminal 148, and an access protrusion 152a of the connecting member 150 is inserted into the access groove 148a.

In one embodiment, bottom insulating members 125 and 128 for insulating the cap plate 114 from the first and second current collectors 123 and 127, respectively, are installed below the cap plate 114. Further, in one embodiment, an insulating member 117 may be arranged between the cap plate 114 and the second terminal 140.

The rechargeable batteries 110 may be arranged in a parallel orientation to one another (e.g., with a gap therebetween) and coupled in series by the connecting member 150, and while the first terminals 130 and the second terminals 140 of neighboring rechargeable batteries 110 are alternately disposed, the connecting member 150 is inserted into the first terminal 130 of one rechargeable battery 110 and the second terminal 140 of another rechargeable battery 110 neighboring the same.

Figure 3:
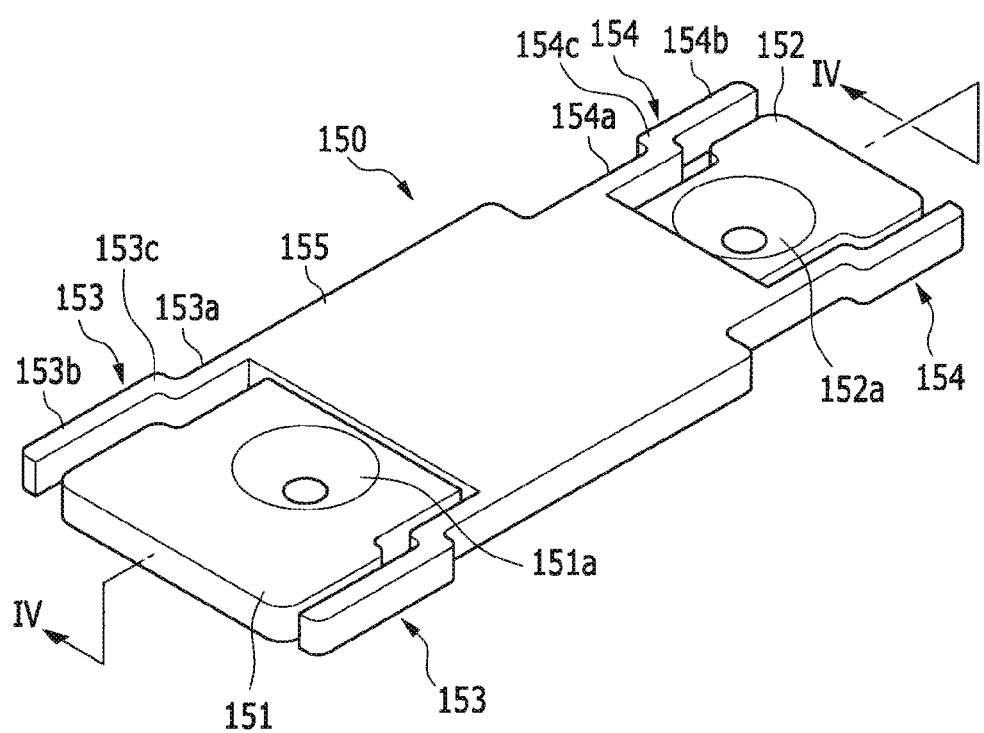
FIG. 3 is a perspective view of a connecting member of the battery module of FIG. 1.
Figure 4:
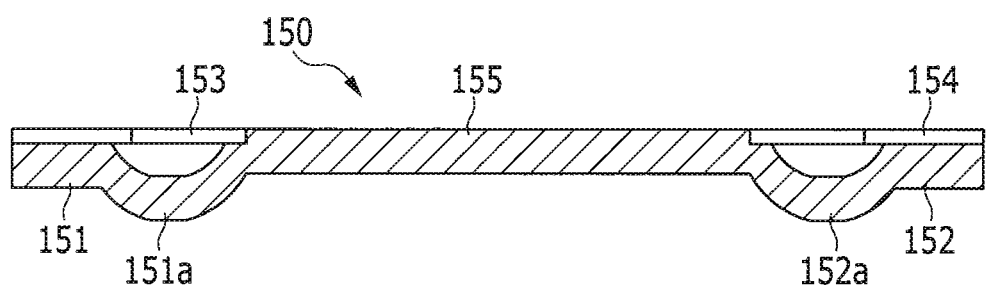
FIG. 4 is a cross-sectional view of the connecting member of FIG. 3, taken along the line IV-IV.

FIG. 3 is a perspective view of a connecting member 150 of a battery module according to one exemplary embodiment of the present invention, and FIG. 4 is a cross-sectional view of the connecting member 150, taken along the line IV-IV of FIG. 3.

Referring to FIGS. 3 and 4, the connecting member 150 is generally plate-shaped and includes a connecting plate 155 disposed at a central region, a first access unit 151 protruded at an end of one side in a lengthwise direction of the connecting plate 155, and a second access unit 152 protruded at an end of another side in a lengthwise direction of the connecting plate 155. The connecting member 150 is made of a conductive metal, such as aluminum, copper, stainless steel, or clad metal.

In one embodiment, a hook 153 configured to be supported on the first terminal 130 and a hook 154 configured to be supported on the second terminal 140 are formed on sides of the connecting member 150.

The first access unit 151, in one embodiment, is generally plate-shaped, and is disposed below the connecting plate 155 such that the top surface of the first access unit 151 is below the top surface of the connecting plate 155. Further, in one embodiment, the first access unit 151 includes the access protrusion 151a protruded downward. The access protrusion 151a is protruded in a generally circular shape and has a generally arc-shaped cross-section. In one embodiment, a groove that is dented during formation of the access protrusion 151a may be formed on a top portion of the access protrusion 151a.

In one embodiment, the hook 153 is formed to have a bar shape that is protruded at both ends in a widthwise direction of the connecting plate 155 and includes a bent part. The hook 153 is separately disposed from the first access unit 151 by a distance (e.g., a predetermined distance), and a gap is formed between the first access unit 151 and the hook 153. The hook 153, in one embodiment, includes a first bar 153a protruded from the connecting plate 155 and a second bar 153b bent to the outside from the first bar 153a at a bent part 153c, and the bent part 153c is hooked on the first terminal 130 in a side direction.

FIG. 5a sectional perspective view of the first terminal 130 according to one exemplary embodiment of the present invention.

Figure 5:
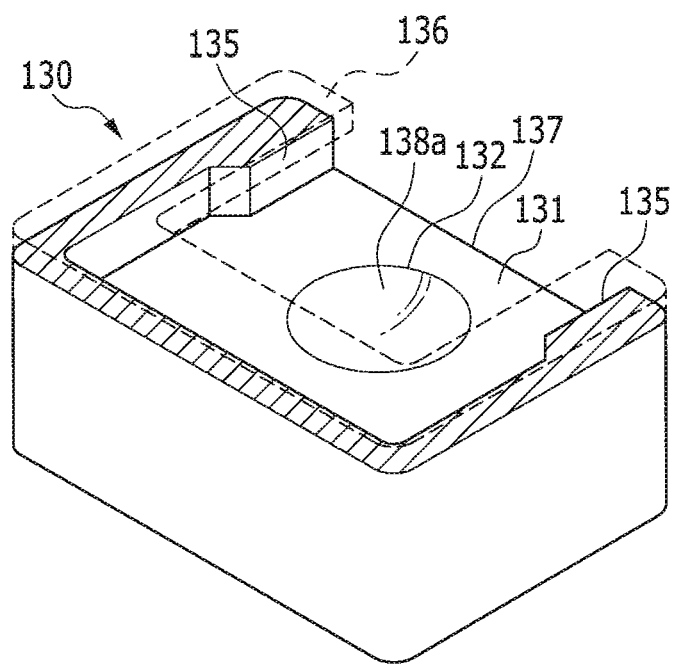
FIG. 5 is a sectional perspective view of a first terminal of the battery module of FIG. 1.

Referring to FIGS. 2 and 5, a connecting groove 131 into which the first access unit 151 of the connecting member 150 is inserted is formed at the first terminal 130, and a hole 132 extended on the bottom is formed on the bottom surface of the connecting groove 131. The bottom terminal 138 is inserted into the hole 132 in the bottom, and the access protrusion 151a is inserted into the access groove 138a of the bottom terminal 138 on the top.

In one embodiment, a supporter 135 protruding to the inside is formed on both side walls of the connecting groove 131, and the supporter 135 is formed at an entrance side into which the first access unit 151 is inserted. A pressurizer 136 for applying downward pressure on the first access unit 151 is formed on the top part of the connecting groove 131. The pressurizer 136, in one embodiment, is formed as a rib that is protruded to the inside from the edge of the connecting groove 131 and is formed on the three sides other than the entrance side into which the first access unit 151 is inserted. The pressurizer 136 contacts the top surface of the hook 153 to apply downward pressure on the connecting member 150 such that the access protrusion 151a is securely combined with the first terminal 130.

A combination between the connecting member 150 and the first terminal 130 according to one embodiment is described further below with reference to FIGS. 2 and 5. When the first access unit 151 is inserted into the connecting groove 131, the hook 153 is deformed or bent toward the first access unit 151 by the protruded supporter 135 and is then restored after having passed through the supporter 135, and, in this instance, the bent part 153c is hooked on the supporter 135 to prevent or substantially prevent breakaway, or release, of the hook 153. The side of the restored hook 153 contacts the inner wall of the connecting groove 131.

Also, the access protrusion 151a is inserted into the access groove 138a formed on the bottom terminal 138 and is retained therein. When the first access unit 151 is inserted, the first access unit 151 is bent upward by the access protrusion 151a with respect to the connecting plate 155, and when the access protrusion 151a is inserted into the access groove 138a formed on the bottom terminal 138, the first access unit 151 is then restored.

The pressurizer 136, in one embodiment, applies downward pressure to the top surface of the hook 153 such that the access protrusion 151a may be closely attached to the bottom terminal 138. According to one exemplary embodiment, the side surface and the top surface of the hook 153 are attached to the first terminal 130 by the supporter 135 and the pressurizer 136 such that the connecting member 150 is prevented or substantially prevented from moving due to vibration or impact which could otherwise deteriorate contact between the first terminal 130 and the connecting member 150. As such, the battery module according to embodiments of the present invention is particularly applicable as a motor-driving power source for propelling hybrid vehicles or electric vehicles. Particularly, since the pressurizer 136 applies pressure to the top surface of the connecting member 150 such that the access protrusion 151a and the first terminal 130 are closely attached with each other while the access protrusion 151a is inserted into the first terminal 130, the first terminal 130 and the connecting member 150 may be easily contacted to each other without welding.

As shown in FIGS. 3 and 4, the second access unit 152, in one embodiment is formed having a generally plate shape and is disposed below the connecting plate 155 such that a top surface of the second access unit 152 is lower than the top surface of the connecting plate 155.

The second access unit 152, in one embodiment, has an access protrusion 152a protruded downward. The access protrusion 152a, in one embodiment, is protruded in a generally circular shape and has a cross section having a generally arc shape. In one embodiment, a groove that is dented during formation of the access protrusion may be formed on the top part of the access protrusion 152a. In one embodiment, the second access unit 152 is narrower than the first access unit 151.

In one embodiment, the hook 154 is formed to have a generally bar shape that is protruded at both sides in a widthwise direction of the connecting plate 155 and has a bent part 154c. In one embodiment, a gap between the second access unit 152 and the neighboring hook 154 is formed to be less than the gap between the first access unit 151 and the neighboring hook 153.

The hook 154 is separately disposed from the second access unit 152 by a distance (e.g., a predetermined distance) such that a gap is formed between the second access unit 152 and the hook 154. The hook 154 includes a first bar 154a protruded on the connecting plate 155 and a second bar 154b bent to the outside from the first bar 154a at the bent part 154c, and the bent part 154c is hooked on the second terminal 140 in a side direction.

Figure 6:
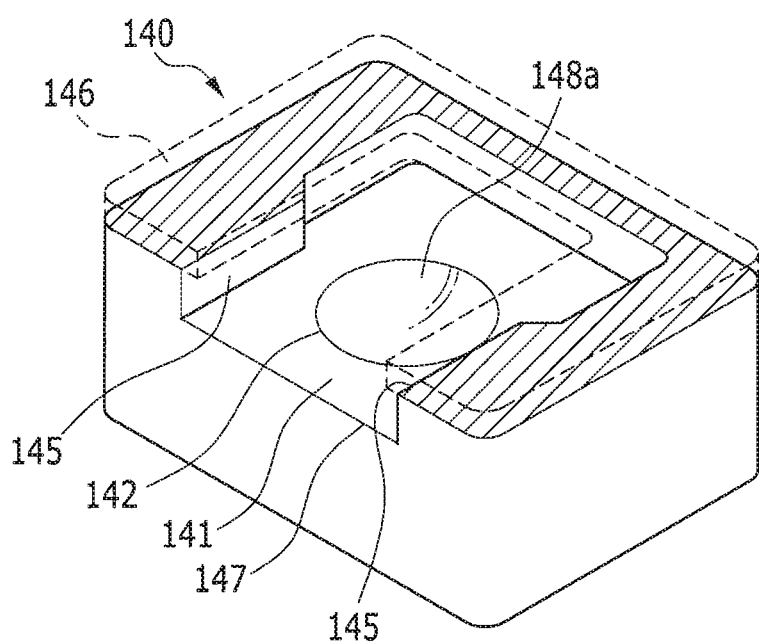
FIG. 6 is a sectional perspective view of a second terminal of the battery module of FIG. 1.

FIG. 6 is a sectional perspective view of the second terminal 140 according to one exemplary embodiment of the present invention.

Referring to FIGS. 2 and 6, a connecting groove 141 into which the second access unit 152 of the connecting member 150 is inserted is formed at the second terminal 140, and a hole 142 extended on the bottom is formed on the bottom surface of the connecting groove 141. The bottom terminal 148 is inserted into the hole 142 in the bottom, and the access protrusion 152a is inserted into the access groove 148a of the bottom terminal 148 on the top.

A supporter 145 protruded to the inside is formed on both side walls of the connecting groove 141, and the supporter 145 is formed at an entrance side into which the second access unit 152 is inserted. In one embodiment, a distance between the supporters 145 formed on the second terminal 140 is less than a distance between the supporters 135 formed on the first terminal 130.

A pressurizer 146 for applying downward pressure on the second access unit 152 is formed on the top part of the connecting groove 141. The pressurizer 146, in one embodiment, is formed as a rib that is protruded to the inside from the edge of the connecting groove 141 and is formed on the three sides other than the entrance side into which the second access unit 152 is inserted. The pressurizer 136 contacts the top surface of the hook 154 to apply downward pressure on the connecting member 150 such that the access protrusion 152a is securely combined with the second terminal 140.

A combination between the connecting member 150 and the second terminal 140 according to one embodiment is described further below with reference to FIGS. 2 and 6. When the second access unit 152 is inserted into the connecting groove 141, the hook 154 is deformed or bent toward the second access unit 152 by the protruded supporter 145 and is then restored after having passed through the supporter 145, and, in this instance, the bent part 154c is hooked on the supporter 145. The side of the restored hook 154 contacts the inner wall of the connecting groove 141. Also, the access protrusion 152a is inserted into the access groove 148a formed on the bottom terminal 148 and is retained therein. When the second access unit 152 is inserted, the second access unit 152 is bent upward by the access protrusion 152a with respect to the connecting plate 155, and when the access protrusion 152a is inserted into the access groove 148a formed on the bottom terminal 148, the second access unit 152 is then restored.

The pressurizer 146 applies downward pressure on the top surface of the hook 154 such that the access protrusion 152a may be closely attached to the bottom terminal 148. According to one exemplary embodiment, the side surface and the top surface of the hook 154 are attached to the second terminal 140 by the supporter 145 and the pressurizer 146 such that the connecting member 150 is prevented or substantially prevented from moving due to vibration or impact which could otherwise deteriorate contact between the second terminal 140 and the connecting member 150. In one embodiment, a distance between the hooks 154 combined with the second terminal 140 is less than a distance between the hooks 153 combined with the first terminal 130, and a distance between the supporters 145 of the second terminal 140 is less than a distance between the supporters 135 of the first terminal 130. As a result, in one embodiment, the first access unit 151 is not combinable with the second terminal 140 to prevent or substantially prevent an incorrect combination with the connecting member 150.

Further, a connecting groove 131 into which the connecting member 150 is inserted is formed on the first terminal 130, and a connecting groove 141 into which a connecting member 150 is inserted is formed on the second terminal 140 such that an opening 137 into which the connecting member 150 is inserted is formed on a side facing a first direction on the first terminal 130, and an opening 147 into which the connecting member 150 is inserted is formed on a side facing an opposite direction of the first direction on the second terminal 140. Here, the first direction represents a direction that faces the neighboring rechargeable battery 110.

That is, the opening 137 formed on the first terminal 130 and the opening 147 formed on the second terminal 140 face opposite directions thereby preventing or substantially preventing an incorrect combination of the connecting member 150 and the terminals 130 and 140 and facilitating easily combining the connecting member 150 and the terminals 130 and 140 by moving the rechargeable battery 110 in the side direction of the connecting member 150. In addition, during the combination of the terminals 130 and 140 and the connecting member 150, the supporters 135 and 145 and the pressurizers 136 and 146 fix the connecting member 150 in the height direction and the side direction, thereby preventing or substantially preventing separation or vibration of the connecting member 150.

Figure 7:
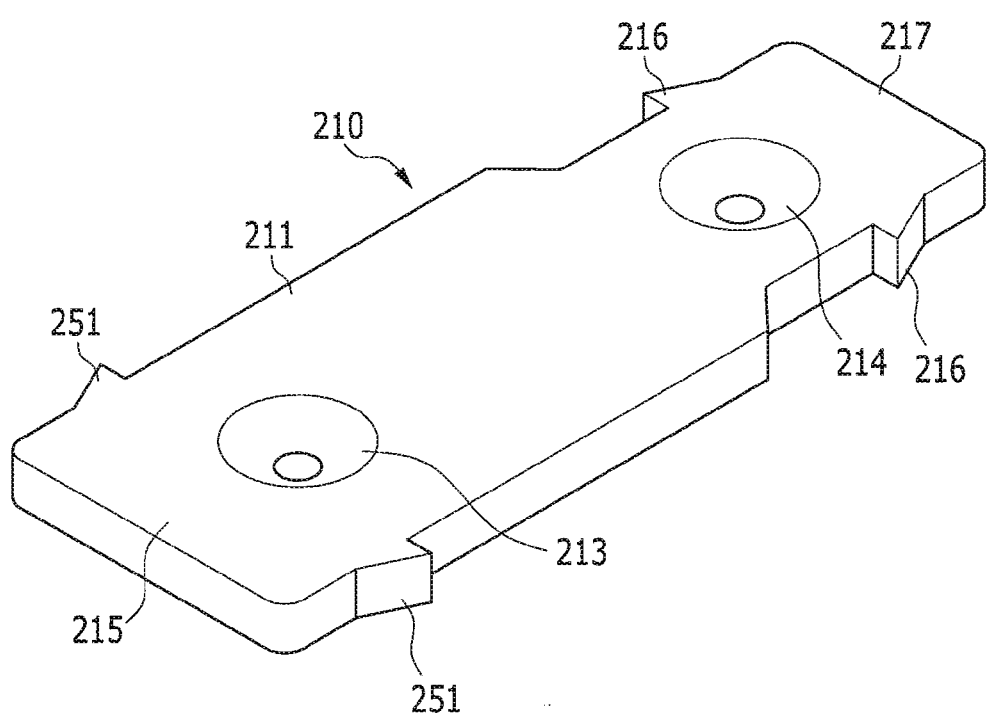
FIG. 7 is a perspective view of a connecting member of a battery module according to another exemplary embodiment of the present invention.
Figure 8:
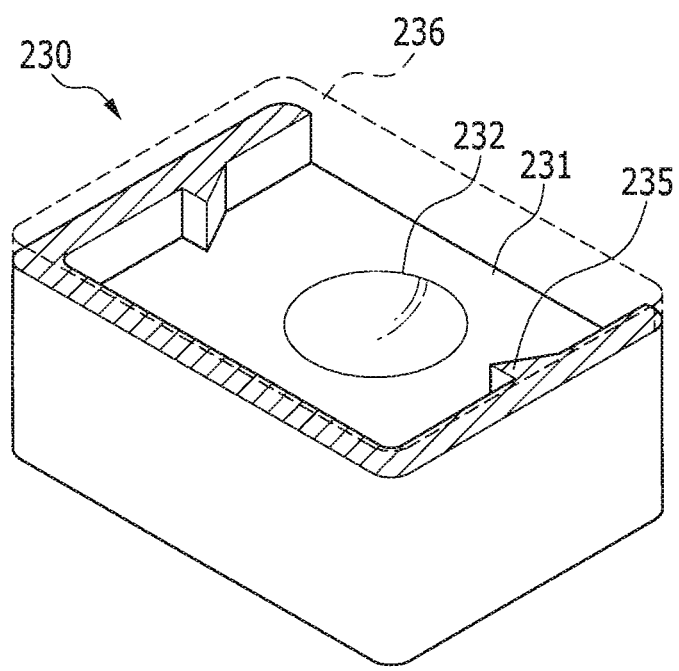
FIG. 8 is a sectional perspective view of a first terminal of a battery module according to another exemplary embodiment of the present invention.
Figure 9:
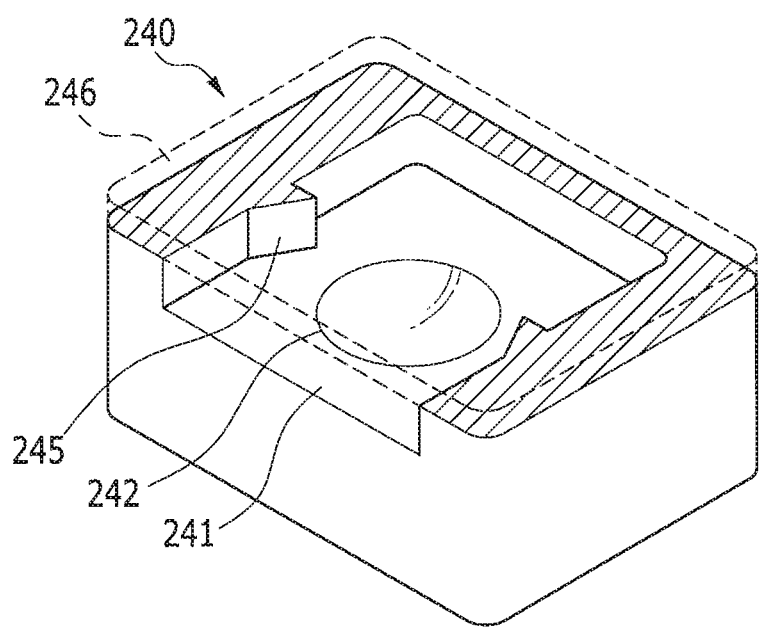
FIG. 9 is a sectional perspective view of a second terminal of a battery module according to another exemplary embodiment of the present invention.

FIG. 7 is a perspective view of a connecting member of a battery module according to another exemplary embodiment of the present invention; FIG. 8 is a sectional perspective view of a first terminal according to another exemplary embodiment of the present invention; and FIG. 9 is a sectional perspective view of a second terminal according to another exemplary embodiment of the present invention.

Referring to FIG. 7, a battery module according to another exemplary embodiment of the present invention has a same configuration as the battery module 100 described above except for a configuration of a connecting member 210, a first terminal 230, and a second terminal 240. Therefore, description of components or features that are the same as those described above will not be repeated.

The connecting member 210, in one embodiment, has a generally plate shape and includes a connecting plate 211 disposed in the center, a first access unit 215 protruded at an end on one side of the connecting plate 211 in the lengthwise direction, and a second access unit 217 protruded at an end of another side of the connecting plate 211 in the lengthwise direction. Also, a hook 251 supported by the first terminal 230 and a hook 216 supported by the second terminal 240 are formed on sides of the connecting member 210.

The first access unit 215, in one embodiment, is formed to have a generally plate shape and has an access protrusion 213 protruded downward. The access protrusion 213 is protruded having a generally circular shape and has a cross section having a generally arc shape. In one embodiment, a groove that is dented during formation of the access protrusion 213 may be formed on the top part of the access protrusion 213.

In one embodiment, a hook 251 is formed to be protruded on both sides of the first access unit 215, and is formed to have a gradually decreasing width along a direction toward the end of the connecting member 210 in the lengthwise direction. In one embodiment, the hook 251 has a substantially a triangular cross-sectional shape.

The second access unit 217, in one embodiment, is formed to have a width that is less than a width of the first access unit 215 and has a hook 216 protruded on both sides. The hook 216 is formed to have a width that gradually decreases along a direction toward the end of the connecting member 210 in the length direction, and the hook 216 has a substantially triangular cross-sectional shape.

As shown in FIG. 8, a connecting groove 231 into which the first access unit 215 of the connecting member 210 is inserted is formed on the first terminal 230, and a hole 232 extended on the bottom is formed in the bottom surface of the connecting groove 231. A bottom terminal is inserted into the hole 232 in the bottom part, and the access protrusion 213 is inserted into an access groove of the bottom terminal from the top part.

A supporter 235 protruded to the inside is formed on both side walls of the connecting groove 231, and the supporter 235 is formed to have a width that gradually decreases toward an entrance side of the connecting groove 231 such that the supporter 235 may be combined with the hook 251. In one embodiment, the supporter 235 has a substantially triangular cross-sectional shape.

Accordingly, when the first access unit 215 is inserted into the connecting groove 231, the supporter 235 and the hook 251 are deformed or bent inward and then restored from the deformed state, and vertically protruding surfaces of the supporter 235 and the hook 251 make contact with each other, thereby preventing or substantially preventing the first access unit 215 from being separated from the connecting groove 231.

In one embodiment, a pressurizer 236 for applying downward pressure on the first access unit 215 is formed on the top part of the connecting groove 231. The pressurizer 236 is formed as a plate covering the top part of the connecting groove 231. The pressurizer 236 contacts the top surface of the first access unit 215 to apply downward pressure on the connecting member 210 such that the access protrusion 213 is securely combined with the first terminal 230.

As shown in FIG. 9, a connecting groove 241 into which the second access unit 217 of the connecting member 210 is inserted is formed on the second terminal 240, and a hole 242 extended in the bottom is formed in the bottom surface of the connecting groove 241. A bottom terminal is inserted into the hole 242 in the bottom, and the access protrusion 214 is inserted into an access groove of the bottom terminal from the top part.

In one embodiment, a supporter 245 protruded to the inside is formed on both side walls of the connecting groove 241, and is formed to have a gradually decreasing width in a direction toward the entrance of the connecting groove 241 such that it may be combined with the hook 216. In one embodiment, the supporter 245 has a substantially triangular cross-sectional shape.

Accordingly, when the second access unit 217 is inserted into the connecting groove 241, the supporter 245 and the hook 216 are deformed or bent, and then are restored from a deformed shape, and vertically protruding surfaces of the supporter 246 and the hook 216 make contact with each other, thereby preventing or substantially preventing the second access unit 217 from being separated from the connecting groove 241.

In one embodiment, a pressurizer 246 for applying downward pressure on the second access unit 217 is formed on the top part of the connecting groove 241. The pressurizer 246 is formed as a plate for covering the top part of the connecting groove 241. The pressurizer 246 contacts the top surface of the second access unit 217 to apply downward pressure on the connecting member 210 such that the access protrusion 214 is securely combined with the second terminal 240.

Figure 10:
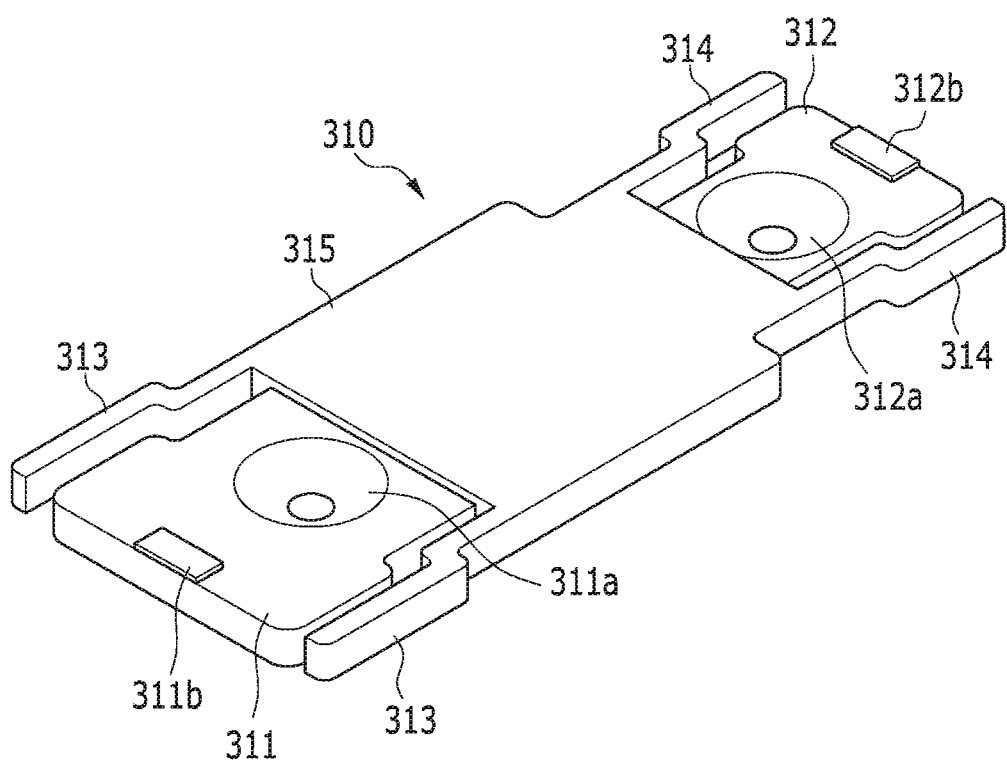
FIG. 10 is a perspective view of a connecting member of a battery module according to another exemplary embodiment of the present invention.

FIG. 10 is a perspective view of a connecting member of a battery module according to another exemplary embodiment of the present invention.

Referring to FIG. 10, a battery module according to another exemplary embodiment has the same configuration as the battery module 100 described above except for a configuration of a connecting member 310. Therefore, description of components or features that are the same as those described above will not be repeated.

The connecting member 310, in one embodiment, is formed having a generally plate shape and includes a connecting plate 315 disposed at the center, a first access unit 311 protruded at an end of one side of the connecting plate 315 in the lengthwise direction, and a second access unit 312 protruded at an end of another side of the connecting plate 315 in the lengthwise direction. Also, a hook 313 supported on a first terminal and a hook 314 supported on a second terminal are formed on sides of the connecting member 310.

The first access unit 311, in one embodiment, has a generally plate shape and is disposed below the connecting plate 315 such that a top surface of the first access unit 311 is below a top surface of the connecting plate 315. In one embodiment, the first access unit 311 includes an access protrusion 311a protruded downward. The access protrusion 311a, in one embodiment, is protruded in a generally circular shape and has a cross section having a generally arc shape. In one embodiment, a groove that is dented during formation of the access protrusion 311a may be formed on the top part of the access protrusion 311a.

A reinforcing unit 311b contacting a pressurizer formed on a first terminal is protruded upward at an end of the first access unit 311 in the lengthwise direction. Accordingly, the pressurizer applies downward pressure on the first access unit 311 as well as on the hook 313 such that the access protrusion 311a and a bottom terminal of the first terminal are more closely contacted with each other.

Further, the hook 313 is formed to have a generally bar shape protruded at both sides of the connecting plate 315 in the widthwise direction and has a bent part. The hook 313 is separately disposed from the first access unit 311 by a distance (e.g., a predetermined distance) such that a gap is formed between the first access unit 311 and the hook 313.

The second access unit 312, in one embodiment, is formed to have a generally plate shape and is disposed below the connecting plate 315 such that a top surface of the second access unit 312 is below the top surface of the connecting plate 315.

The second access unit 312, in one embodiment, includes an access protrusion 312*a* protruded downward. The access protrusion 312*a*, in one embodiment, is protruded having a generally circular shape and has a cross section having a generally arc shape. In one embodiment, a groove that is dented during formation of the access protrusion 312*a* may be formed on the top part of the access protrusion 312*a*. The second access unit 312, in one embodiment, is narrower than the first access unit 311.

A reinforcing unit 312*b* contacting a pressurizer of a second terminal is formed to be protruded upward at an end of the second access unit 312 in the lengthwise direction. The pressurizer applies downward pressure on the second access unit 312 as well as on the hook 314 such that the access protrusion 312*a* and the bottom terminal are closely contacted with each other.

In one embodiment, the hook 314 is formed to have a generally bar shape protruded at both sides of the connecting plate 315 in the widthwise direction, and has a bent part. In one embodiment, a distance between the hooks 314 that are formed near the second access unit 312 is less than a distance between the hooks 313 formed near the first access unit 311.

Figure 11:
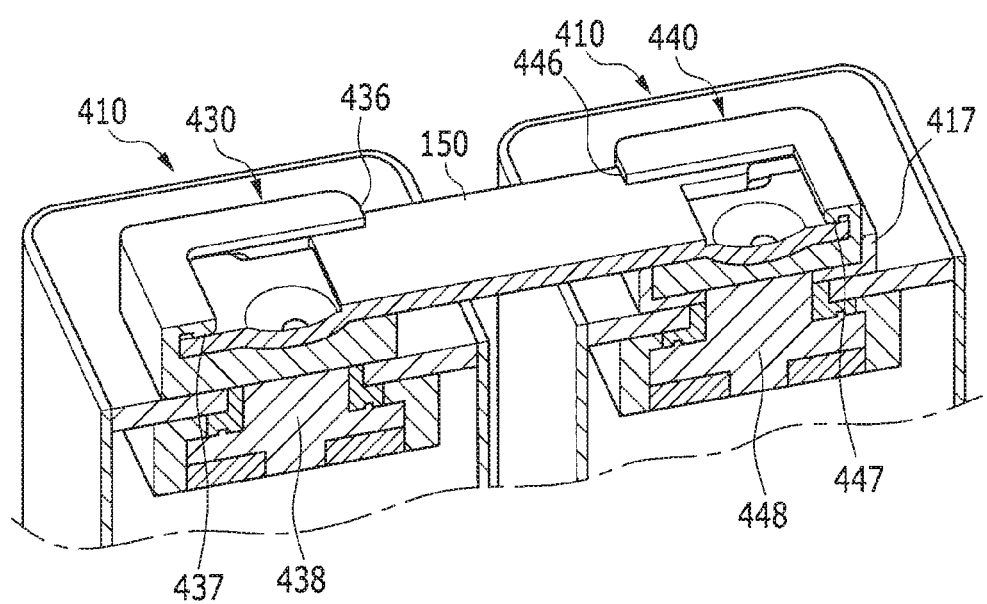
FIG. 11 is a partial sectional perspective view of a battery module according to another exemplary embodiment of the present invention.

FIG. 11 is a partial sectional perspective view of a battery module according to another exemplary embodiment of the present invention.

Referring to FIG. 11, a battery module according to another exemplary embodiment of the present invention has the same configuration as the battery module 100 described above except for a configuration of a first terminal 430 and a second terminal 440. Therefore, description of components or features that are the same as those described above will not be repeated.

The battery module according to one embodiment includes a plurality of rechargeable batteries 410, a first terminal 430 and a second terminal 440, and the connecting member 150 for electrically connecting the rechargeable batteries 410.

The first terminal 430, in one embodiment, further includes a bottom terminal 438 that is attached to the bottom surface (e.g., via welding), and an access groove into which the access protrusion formed on the connecting member 150 is inserted is formed on the first terminal 430. An end of the connecting member 150 in the lengthwise direction is inserted into the connecting groove formed on the first terminal 430, and a pressurizer 436 for applying pressure on the top surface of the connecting member 150 is formed on the first terminal 430. The pressurizer 436 is protruded to the inside on the top part of the connecting groove. A reinforcing unit 437 that is protruded downward and applies pressure to the top surface of the connecting member 150 is formed on a lower surface of the pressurizer 436 facing the top surface of the connecting member 150 (e.g., in the lengthwise direction). Accordingly, the reinforcing unit 437 applies pressure on the top surface of the first access unit formed on the connecting member 150 such that the access protrusion can be closely contacted with the bottom terminal 438.

The second terminal 440 further includes a bottom terminal 448 coupled to the bottom surface (e.g., via welding), and an access groove into which the access protrusion formed on the connecting member 150 is inserted is formed on the second terminal 440. An end of the connecting member 150 in the lengthwise direction is inserted into the access groove formed on the second terminal 440, and a pressurizer 446 for applying pressure on the top surface of the connecting member 150 is formed on the second terminal 440. The pressurizer 446 is formed to be protruded to the inside at the top part of the access groove. A reinforcing unit 447 that is protruded to the bottom and applies pressure on the top surface of the connecting member 150 is formed on a bottom surface of the pressurizer 446 facing the top surface of the connecting member 150 (e.g., in the lengthwise direction). Therefore, the reinforcing unit 447 applies pressure on the top surface of the first access unit formed on the connecting member 150 such that the access protrusion is closely contacted with the bottom terminal 448.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
   a plurality of rechargeable batteries comprising a first terminal and a second terminal; and
   a substantially plate-shaped connecting member electrically connecting rechargeable batteries of the plurality of rechargeable batteries through the first and second terminals, the connecting member comprising an access protrusion protruded in a first direction toward the first terminal and toward a case of a respective rechargeable battery of the plurality of rechargeable batteries from which the first terminal protrudes,
   wherein the first terminal comprises a pressurizer configured to press the access protrusion in the first direction toward a part of the first terminal,
   wherein the first terminal includes a connecting groove having a substantially rectangular cross-sectional shape corresponding to the substantially plate-shaped connecting member, the connecting member being insertable into the connecting groove in a second direction perpendicular to the first direction, the first terminal including a first side wall facing the connecting groove and a second side wall opposite the first side wall and facing the connecting groove, the second side wall spaced apart from the first side wall in a third direction perpendicular to each of the first and second directions, and
   wherein the connecting member is inserted into the connecting groove, and the pressurizer is formed as a rib that protrudes toward the inside from an edge of the connecting groove.

2. The battery module of claim 1, wherein the part of the first terminal has an access groove, and the access protrusion is received in the access groove.

3. The battery module of claim 1, wherein the connecting member further comprises:
   a connecting plate;
   a first access unit protruded at an end of the connecting plate in a lengthwise direction; and
   a second access unit protruded at another end of the connecting plate in a direction opposite the lengthwise direction,
   wherein the access protrusion is on the first access unit, and the connecting member further comprises another access protrusion on the second access unit.

4. The battery module of claim 3, wherein a width of the first access unit in a widthwise direction is greater than a width of the second access unit in the widthwise direction.

5. The battery module of claim 3, wherein a top surface of the first access unit is below a top surface of the connecting plate.

6. The battery module of claim 5, wherein the pressurizer comprises a reinforcing unit protruded toward and contacting the first access unit.

7. The battery module of claim 5, wherein the first access unit comprises a reinforcing unit protruded toward and contacting the pressurizer.

8. The battery module of claim 3,
wherein the connecting member further comprises a hook protruding from a first side of the connecting member, and
wherein the first access unit is inserted into the connecting groove, and the first terminal comprises a supporter protruding inside the connecting groove and contacting the hook.

9. The battery module of claim 8, wherein the hook is protruded from the connecting plate and is spaced apart from the first access unit with a gap therebetween in a widthwise direction.

10. The battery module of claim 9, wherein the hook includes a first bar protruded from the connecting plate and a second bar that is bent to the outside from the first bar.

11. The battery module of claim 8,
wherein the hook protrudes from the first side at the end of the connecting plate, and the connecting member further comprises another hook protruding at the end of the connecting plate from a second side of the connecting member opposite the first side,
wherein the connecting member further comprises a second hook protruding from the first side of the connecting member at the another end of the connecting plate, and another second hook protruding from the second side of the connecting member at the another end of the connecting plate, and
wherein a distance between the hook and the another hook that are near the first access unit is greater than a distance between the second hook and the another second hook that are near the second access unit.

12. The battery module of claim 11,
wherein the supporter protrudes from the first side wall facing the connecting groove, and the first terminal further comprises another supporter protruding from the second side wall opposite the first side wall and facing the connecting groove, the another supporter contacting the another hook,
wherein the second terminal has a connecting groove into which the second access unit is inserted, and the second terminal comprises a second supporter protruding inside the connecting groove of the second terminal and contacting the second hook, and another second supporter protruding inside the connecting groove opposite the second supporter, the another second supporter contacting the another second hook, and
wherein a distance between the supporter and the another supporter in the connecting groove of the first terminal in which the first access unit is inserted is greater than a distance between the second supporter and the another second supporter in the connecting groove of the second terminal in which the second access unit is inserted.

13. The battery module of claim 8, wherein the hook is a protrusion that is protruded in a widthwise direction of the first access unit, and the supporter is a protrusion that is protruded from the inside of the connecting groove.

14. The battery module of claim 1,
wherein the first terminal has a hole formed therein, and the first terminal further comprises a bottom terminal inserted in the hole and connected to a current collector that is electrically connected to an electrode assembly, and
wherein the bottom terminal has an access groove into which the access protrusion is inserted.

15. A battery module comprising:
a plurality of rechargeable batteries comprising a first terminal and a second terminal, the first and second terminals protruding through respective cap plates of the rechargeable batteries, each of the cap plates facing a same outward direction; and
a connecting member electrically connecting the rechargeable batteries,
wherein the first terminal has a connecting groove having a first opening in a side facing a first direction perpendicular to the outward direction, and a first portion of the connecting member is inserted in the in the connecting groove of the first terminal through the first opening, the first portion of the connecting member comprising a hook inserted in the connecting groove of the first terminal and coupling the connecting member and the first terminal to each other,
wherein the second terminal has a connecting groove having a second opening in a side facing a second direction perpendicular to the outward direction and opposite the first direction, and a second portion of the connecting member is inserted in the connecting groove of the second terminal through the second opening, the second portion of the connecting member comprising a hook inserted in the connecting groove of the second terminal and coupling the connecting member and the second terminal to each other,
wherein the first terminal comprises an inner wall facing the connecting groove of the first terminal, and a supporter protruding from the inner wall toward an inside of the connecting groove, and
wherein the hook of the first portion of the connecting member contacts the supporter within the connecting groove of the first terminal to couple the connecting member and the first terminal to each other.

* * * * *